May 6, 1941. J. A. MacLEAN Re. 21,793

FLOOR CLIP AND THE METHOD OF MAKING SAME

Original Filed Feb. 9, 1931

Inventor:
JOHN A. MAC LEAN, DECEASED,
by MAC LEAN-FOGG LOCK NUT
COMPANY, ASSIGNEE By: Mc Caleb and Wendt, Attorneys.

Reissued May 6, 1941

Re. 21,793

UNITED STATES PATENT OFFICE 21,793

FLOOR CLIP AND THE METHOD OF MAKING SAME

John A. MacLean, deceased, late of Chicago, Ill., by MacLean-Fogg Lock Nut Company, assignee, Chicago, Ill.

Original No. 1,922,814, dated August 15, 1933, Serial No. 514,478, February 9, 1931. Application for reissue and division December 16, 1940, Serial No. 370,429

8 Claims. (Cl. 29—148)

The invention relates to means for securing floor boards and more particularly wooden floor boards or planks to a supporting structure of the steel beam type.

An object of the present invention is to provide an improved floor clip for securing floor boards to a supporting beam or sill.

Another object of the invention is to provide a clip which is simple in construction and at the same time provide a clip which effectively secures the floor boards to a supporting sill.

Another object of the invention is an improved method of constructing a clip of the above type from a bar of rolled metal stock.

Another object of the invention is the improved method of constructing a clip of the above type from predetermined lengths or widths of metal bars of the desired cross-sectional form which provides for a minimum amount of tooling when fabricating such lengths or widths into their final form.

Another object of the invention is the improved method of constructing a clip of the above type from predetermined lengths or widths of metal bars of the desired cross-sectional form which provides the clip fabricated from such lengths or widths with integral means for locking the nut which clamps the clip in securing position against rotation.

Another object of the invention is the provision of an improved modified form of floor clip, in which the prongs for engaging the underside of the floor are also adapted to be made out of that part of the stock which is of reduced cross section so as to facilitate the prongs being bent transversely to the body of the clip and to aid in making them penetrate the wood more readily.

With these and other objects in view, the invention consists of novel details of construction and arrangement of parts as will be more fully hereinafter disclosed and particularly pointed out in the appended claims.

For a more complete understanding of the invention reference may be had to the accompanying drawing, in which several forms of the invention are illustrated, and in which.

Figure 1:
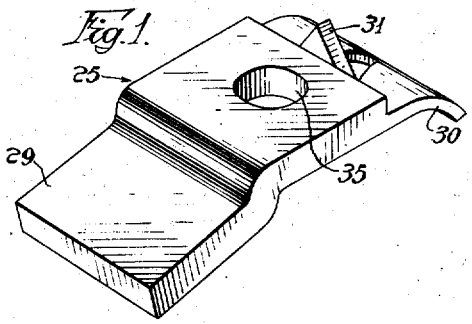
Fig. 1 is a view in perspective of a floor clip embodying the invention.
Figure 2:
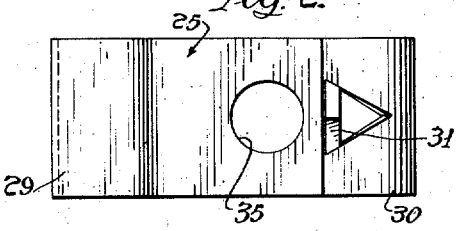
Fig. 2 is a top plan view of the floor clip illustrated in Fig. 1.
Figure 4:
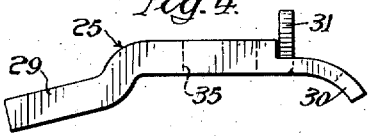
Fig. 4 is a side elevational view of the floor clip of Fig. 1.
Figure 3:
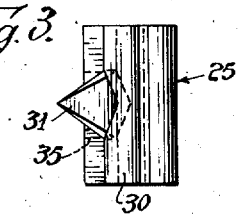
Fig. 3 is a right end elevation of Fig. 2.
Figure 6:
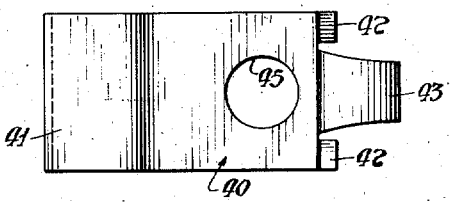
Fig. 6 is a top plan view of the floor clip of Fig. 5.
Figure 5:
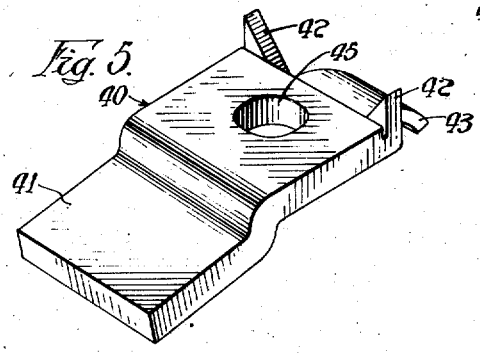
Fig. 5 is a view in perspective of another floor clip embodying the invention.
Figure 8:
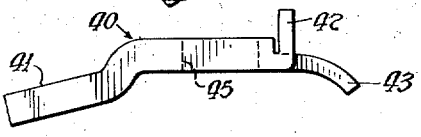
Fig. 8 is a side elevational view of the floor clip of Fig. 6.

The present application is one of two divisions of a reissue application filed to cover the same subject-matter as the original Patent No. 1,922,814, of John A. MacLean, and the present application is particularly directed to the subjects-matter of Figs. 7 to 15 of the original patent.

The mode of use of the floor clip illustrated in the drawing is shown in section in the co-pending reissue application, Serial No. 370,428, filed December 16, 1940, which is directed to Figs. 1 to 6 of the parent patent.

Figs. 1 to 4 herein illustrate one form of the invention, in which that portion of a bar of stock of reduced cross section is utilized both for forming the wood-engaging prongs and the nut-engaging lock.

Figure 9:
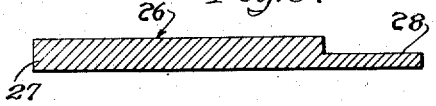
Fig. 9 is a transverse sectional view of the rolled metal bar from which the form of clips shown in Figs. 1 to 4 may be fabricated.
Figure 7:
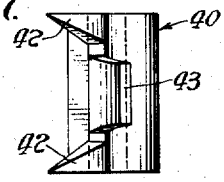
Fig. 7 is a right end elevational view of the floor clip of Fig. 6.

Referring to Fig. 9, the clip 25 is preferably fabricated from a suitable length of a rolled metal bar of the cross-sectional shape 26, illustrated in Fig. 9. This bar comprises a main body portion 27 of rectangular cross section and a narrow integrally formed rib formation 28 extending laterally from the side of the body 27.

The clip 25 may be fabricated from a predetermined length of this bar 26 by means of a suitable shearing and forming operation which is adapted to provide a short length of the bar with an offset portion 29 at one end thereof. This offset portion 29 is out of the plane of the body of the clip 25 and at a proper angle so as to conform to the angle of the lower face of a sill flange with which it engages when the horizontal body portion 25 of the clip bears against the under side of a board.

The clip is also provided with an aperture 35 for a bolt which passes through the flooring, and this aperture may be punched at the same time the offset is formed in the body 25.

The portion 28 of the bar of reduced width is also preferably formed with a substantially triangular tooth or prong 31, which is punched out of this portion of the bar and bent upward, as shown in Fig. 1. The extreme end portion 30 of that part 28 of the bar of reduced thickness is also preferably curved downward in such manner that it facilitates the entry of a bar or prying tool between this part of the clip and the floor so that the member 30 can be bent upward into locking engagement wtih the nut on the underside of the clip, after the clip has been installed.

The prong 31 prevents the clip from rotating while the nut is being tightened, and the wing member 30 provides means for locking the nut after it has been engaged by a suitable tool and bent down to place the wing 30 in contact with the face of a nut.

The mode of use of such floor clips is illustrated in Fig. 1 of the co-pending application, Serial No. 370,428, filed December 16, 1940.

Referring to Figs. 5 to 8, these are views of another modification. The floor clips of the type shown in Fig. 5 may be fabricated from a predetermined length of metal bar 26 of the cross-sectional shape shown in Fig. 9. This bar has a body portion 27 of substantially rectangular shape and a narrow integrally ribbed formation 28 extending laterally from the body portion 27.

The clip 40 may be fabricated from a length of this bar by a suitable shearing and forming operation, which provides the clip with an offset portion 41 at one end thereof. This offset positions the portion 41 out of the plane of the body of the clip and at a proper angle to conform to the angle of the lower face of a sill flange when the main body of the clip bears against the underside of a floor board.

The clip may be provided with a punched aperture 45 at the same time, and with a pair of substantially triangular pointed upwardly extending prongs formed out of that portion of reduced cross-section at one end of the blank. That part of the flange 28 between the prongs 42 may also be formed into a nut-engaging tongue or flange 43, which is simultaneously bent downward in such position that a tool may be very conveniently inserted between this flange 43 and the floor board when the clip is installed, for the purpose of pressing the flange 43 down into engagement with the nut of the bolt that secures the clip to the floor board. As will be apparent from the drawing, the tongue or flange 43 has a cross-sectional area at the point of bending equal to only a small fraction of the cross-sectional area of the body taken on a line extending across the body at the base of the tongue.

The prongs 42 engage in the wood of the floor board and prevent the floor clip from turning with respect to the floor board and sill. The nut-engaging flange 43 is adapted to engage the nut after it has been driven home, and prevent it from turning.

It will thus be observed that the invention comprises an improved floor clip which is provided with an integral formation for holding the nut against loosening and also with an integral prong for engaging in the wood and preventing rotation of the clip.

As the wood-engaging prong is formed out of the portion of the body which is of reduced cross-section, this prong may be more easily formed than if it were made of a thicker part of the body, and the remaining nut-engaging wing is also adapted to be bent more readily into engagement with the nut, due to its reduced cross-sectional area at the point of its juncture with the main body of the clip. The strains, jars, and twists to which floor structures wherein the clips may be used, such as railway cars, are subjected would otherwise inevitably cause rotation of an ordinary clip and working loose of the nut, but by virtue of the prong or prongs with which the clips are equipped, and which are effectively embedded in the underside of the board, such rotation of the clip is prevented.

The locking means integrally formed with the clips when moved into engagement with the nut, after being threaded home, provide means which effectively locks the nuts and prevents them from working loose due to such strains, jars, and twists as just pointed out.

While there is illustrated and described the floor clip and its various modifications associated with a floor construction applicable to a railway car, it is to be undestood that they are applicable for use in securing the boards of a floor in various constructions. The invention should not be limited to the exact structures as shown, as changes and modifications will readily suggest themselves, and it is desired to cover all such changes as come within the spirit and scope of the appended claims.

It is claimed as follows:

1. The method of making a clip of the character described which consists in shearing a predetermined width from a metal bar having a portion of rectangular cross-section and an extended portion of reduced thickness and simultaneously forming said blank to provide an offset portion angularly disposed relative to the body, striking up a prong from the reduced extension adjacent said body and directing the forward portion of said extension downwardly.

2. The method of making a clip of the character described which consists in shearing a predetermined width from a metal bar having a portion of rectangular cross-section and an extended portion of reduced thickness and for simultaneously forming said blank to provide a prong struck up from a portion of said extension adjacent the said body and directing the forward portion of said extension downwardly and providing a portion of said body with an offset to dispose the same angularly with respect to horizontal portion of the same.

3. A floor clip for car flooring or the like, comprising an integral metal member having a supporting body forming an attaching flange and having a bolt aperture, said body having an offset and a frame engaging flange carried by said offset, and an integral extension of said body formed of lesser thickness and adapted to be bent, said extension being located at the end of said clip and having an integral pointed prong punched out of said extension for engagement in the wood, said extension being bendable into engagement with the nut of a securing bolt for locking the nut.

4. A floor clip for car flooring or the like, comprising an integral metal member having a supporting body forming an attaching flange and having a bolt aperture, said body having an offset and a frame engaging flange carried by said offset, and an integral extension of said body formed of lesser thickness and adapted to be bent, said extension being located at the end of said body and formed into a pair of pointed prongs at each side extending into engagement with the wood, and the central part of said extension forming a lug adapted to be bent into engagement with a nut to lock the nut of a securing bolt.

5. In combination in a floor clip for securing together a sill and a floor board supported thereby, a body including a portion for engaging the underside of the board and another portion for engaging under the sill, one of said portions being constructed to receive fastening means for securing the clip to the sill and the floor board, said board-engaging portion including integral means extending upwardly beyond the principal upper face area of the body for engagement with the floor board, and integral means extending downwardly for locking engagement with the fastening means, said upwardly extending means and said downwardly extending means joining the body along a substantially common transverse line.

6. In combination in a floor clip for securing together a sill and a floor board supported thereby, a body including a portion for engaging the underside of said board and another portion for engaging under the sill, one of said portions being constructed to receive fastening means for securing the clip to the sill and the floor board, said floor-engaging portion including an integral floor-engaging part extending upwardly relative to the upper face of said sill-engaging portion, and integral means extending downwardly at the opposite sides of said upwardly extending part for locking engagement with the fastening means.

7. In combination in a floor clip for securing together a sill and a floor board supported thereby, a body including a portion for engaging the underside of said board and another portion for engaging under the sill, one of said portions being constructed to receive fastening means for securing the clip to the sill and the floor board, and integral means extending downwardly beyond the principal lower face area of the body for locking engagement with the fastening means, said floor-engaging portion having separate parts extending upwardly relative to the principal upper face area of the body at opposite sides of said locking means.

8. In a floor clip for securing together a sill and a floor board supported thereby, a body including a portion for engaging the underside of said board and another portion for engaging under the sill, one of said portions being constructed to receive fastening means for securing the clip to the sill and the floor board, and an integral tongue struck from one of said portions extending away from the adjacent area of the body to be bent into locking engagement with the fastening means, said floor-engaging portion including integral means extending upwardly beyond the principal upper face area of the body at opposite sides of said tongue, said tongue having a cross-sectional area at the point of bending equal to only a small fraction of the cross-sectional area of the body taken on a line extending across the body at the base of the tongue.

MacLEAN-FOGG LOCK NUT COMPANY,
*Assignee of John A. MacLean, Deceased,*
By JOHN A. MacLEAN, Jr.,
*President.*